(12) United States Patent
Elliott et al.

(10) Patent No.: US 12,276,356 B2
(45) Date of Patent: Apr. 15, 2025

(54) CHOKE GATE VALVE SYSTEMS AND METHODS

(71) Applicant: Cameron International Corporation, Houston, TX (US)

(72) Inventors: Declan Elliott, Longford (IE); Jerry Martino, Houston, TX (US); Muneeb Dogar, Edmonton (CA); Kyle Beaton, Pittsburgh, PA (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 112 days.

(21) Appl. No.: 17/817,467

(22) Filed: Aug. 4, 2022

(65) Prior Publication Data

US 2023/0041790 A1   Feb. 9, 2023

Related U.S. Application Data

(60) Provisional application No. 63/229,200, filed on Aug. 4, 2021.

(51) Int. Cl.
*F16K 47/04* (2006.01)
*E21B 43/26* (2006.01)
(Continued)

(52) U.S. Cl.
CPC .......... *F16K 47/04* (2013.01); *E21B 43/2607* (2020.05); *F16K 3/0209* (2013.01); *F16K 3/314* (2013.01); *F16K 2200/401* (2021.08)

(58) Field of Classification Search
CPC ........ F16K 47/04; F16K 3/314; F16K 3/0209; F16K 2200/401; E21B 43/2607
See application file for complete search history.

(56) References Cited

U.S. PATENT DOCUMENTS 3,294,112 A * 12/1966 Watkins ................. E21B 34/04
138/46
3,312,241 A * 4/1967 Bryant ................ F16K 31/1221
137/599.08

(Continued)

FOREIGN PATENT DOCUMENTS

CN        202065513 U     12/2011
CN        106545666 A      3/2017
(Continued)

OTHER PUBLICATIONS

Exam Report issued in Canada Patent Application No. 3169546 dated Jan. 29, 2024, 9 pages.

(Continued)

*Primary Examiner* — Craig M Schneider
*Assistant Examiner* — Christopher D Ballman
(74) *Attorney, Agent, or Firm* — Jeffrey D. Frantz

(57) ABSTRACT

A choke gate valve includes a housing that defines a fluid bore and a gate that includes a throttling orifice. The gate is configured to move within the housing between a throttle position in which the gate extends across the fluid bore to position the throttling orifice in the fluid bore to throttle a fluid flow through the fluid bore and an open position in which the gate does not block the fluid bore to enable a full level of the fluid flow through the fluid bore. The choke gate valve may be used as part of a choke gate valve system to transition between first fracturing operations for a first well and second fracturing operations for a second well without shut off of a pump.

14 Claims, 6 Drawing Sheets

(51) Int. Cl.
  *F16K 3/02* (2006.01)
  *F16K 3/314* (2006.01)

(56) References Cited

U.S. PATENT DOCUMENTS

| | | | | |
|---|---|---|---|---|
| 3,463,447 | A | * | 8/1969 | Ripert .................. F16K 3/16 251/328 |
| 3,696,831 | A | * | 10/1972 | Fowler .................. F16K 3/36 251/327 |
| 3,743,238 | A | * | 7/1973 | Watts .................. F16K 47/04 137/550 |
| 3,768,774 | A | * | 10/1973 | Baugh .................. F16K 27/044 251/327 |
| 3,955,591 | A | * | 5/1976 | Baumann .............. F16K 47/02 137/625.33 |
| 4,446,887 | A | * | 5/1984 | Redmon ................ F16K 47/04 251/363 |
| 4,489,756 | A | * | 12/1984 | Balz .................. F16K 3/0263 137/625.33 |
| 4,627,462 | A | * | 12/1986 | Lyons ................. F16K 11/0655 137/625.66 |
| 4,643,226 | A | * | 2/1987 | Balz .................. F16K 3/0209 137/625.33 |
| 5,020,774 | A | * | 6/1991 | Christianson ............ F16K 3/32 251/363 |
| 5,227,062 | A | * | 7/1993 | Olsen .................. F16K 47/04 137/625.33 |
| 5,706,852 | A | * | 1/1998 | Deville ................ F16K 27/044 137/552 |
| 5,971,604 | A | * | 10/1999 | Linga .................. B01F 35/833 251/207 |
| 6,776,388 | B2 | * | 8/2004 | Baumann ............. F16K 3/0218 251/238 |
| 6,973,974 | B2 | * | 12/2005 | McLoughlin ........... E21B 43/12 166/334.4 |
| 8,037,900 | B2 | * | 10/2011 | James .................. F16K 3/0209 137/625.33 |
| 9,366,343 | B2 | * | 6/2016 | Roman ................. F16K 3/32 |
| 9,482,347 | B2 | | 11/2016 | Elliott et al. |
| 10,221,867 | B2 | * | 3/2019 | Hampton ................ F16K 3/18 |
| 10,508,744 | B2 | * | 12/2019 | Roberts ................ F16K 3/0236 |
| 10,900,575 | B2 | * | 1/2021 | McEvoy ................ F16K 3/0227 |
| 2012/0256113 | A1 | * | 10/2012 | Comeaux .............. F16K 3/0227 251/328 |
| 2019/0010781 | A1 | | 1/2019 | Tran |
| 2019/0234520 | A1 | | 8/2019 | Painter |

FOREIGN PATENT DOCUMENTS

| | | |
|---|---|---|
| RU | 2259465 C1 | 8/2005 |
| WO | 2009130652 A1 | 10/2009 |

OTHER PUBLICATIONS

Examination Report issued in Canadian Patent Application No. 3169546 dated Dec. 17, 2024, 9 pages.

CCSC Petroleum Equipment Co., LTD, "Choke Bean—Ceramic Choke Bean—Tungsten Carbide Choke Bean", https://www.ccscpetro.com/choke-bean.html, first published on Jan. 8, 2013 (Aug. 1, 2013) according to Internet Wayback Machine; retrieved on Internet on Dec. 13, 2024 (Dec. 13, 2024).

* cited by examiner

CHOKE GATE VALVE SYSTEMS AND METHODS

CROSS-REFERENCE TO RELATED APPLICATION

This application claims priority to and the benefit of U.S. Provisional Patent Application No. 63/229,200, entitled "CHOKE GATE VALVE" and filed on Aug. 4, 2021, which is incorporated by reference herein in its entirety for all purposes.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

The present disclosure relates to a flow control system, and more particularly, the present disclosure relates to a choke gate valve system.

In a variety of fluid handling systems, a flow of a fluid is controlled by a valve. These fluid handling systems may be employed in any variety of applications and industries, such as oil and gas systems, storage facilities, manufacturing facilities, refineries, water treatment facilities, industrial plants, and the like. For example, in the oil and natural gas industry, valves are employed to direct and regulate the flow of fluids (e.g., gas, water, and oil) in pipes, wells, pumps, vessels, and refineries. Valves generally include an open position that enables fluid flow and a closed position that reduces or completely shuts-off the fluid flow. Valves are also employed to limit (e.g., throttle) a pressure and a flow rate of the fluid flowing through the valve. For example, the valve may be partially closed to partially obstruct the fluid flow, or may include an occlusion that obstructs the fluid flow. Throttling is particularly useful where fluid flow occurs at a pressure and/or a high flow and it is desirable to reduce the pressure and/or the flow rate. Throttling may be particularly well suited to direct fluid flow from oil and gas wells where the pressure of the fluids being expelled from the mineral reservoir may exceed 3,000 pounds per square inch (psi), for instance.

Two exemplary types of valves include gate valves and control valves (e.g., choke valves). Gate valves typically include a moveable gate, static seat rings that seal against the movable gate, and a housing in which the movable gate and the static seat rings are disposed. Generally, the movable gate includes two opposing faces that contact the static seat rings, and the moveable gate includes a flow bore extending between the two opposing faces. The flow bore is slid into alignment with the static seat rings to enable flow through the valve, and the flow bore is slid out of alignment with the static seat rings to shut off the flow through the valve. As the movable gate moves from a sealed or closed position to an unsealed or open position, it slides along a generally straight line between the static seat rings, which are typically affixed to the housing.

Control valves typically include a valve that displaces a solid cylinder (e.g., a "plug" or "stem") that is placed around or inside an annular cylinder or bore. The control valve restricts fluid flow based on a position of the solid cylinder relative to the annular cylinder or bore. One advantage of control valves is their ability to partially occlude flow with linear variations in the flow rate. Although the above discussion relates to a few exemplary types of gate and control valves, a variety of other types of valves exist.

BRIEF DESCRIPTION

In one embodiment, a choke gate valve includes a housing that defines a fluid bore and a gate that includes a throttling orifice. The gate is configured to move within the housing between a throttle position in which the gate extends across the fluid bore to position the throttling orifice in the fluid bore to throttle a fluid flow through the fluid bore and an open position in which the gate does not block the fluid bore to enable a full level of the fluid flow through the fluid bore.

In one embodiment, a choke gate valve system includes a fluid line configured to deliver a fluid flow from a pump to a first tree of a fracturing system. The choke gate valve system also includes a first gate valve positioned along the fluid line between the pump and the first tree. The choke gate valve system further includes a first choke gate valve positioned along the fluid line between the pump and the first tree, and in line with the first gate valve.

In one embodiment, a method of operating a choke gate valve system includes pumping a fluid flow through a fluid line and through a first gate valve in a respective open position during a first fracturing operation for a first well. The method also includes pumping the fluid flow through the fluid line and through a throttling element during a transition from the first fracturing operation for the first well to a second fracturing operation for a second well. The method further includes pumping the fluid flow through the fluid line and through a second gate valve in a respective open position during the second fracturing operation for the second well.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
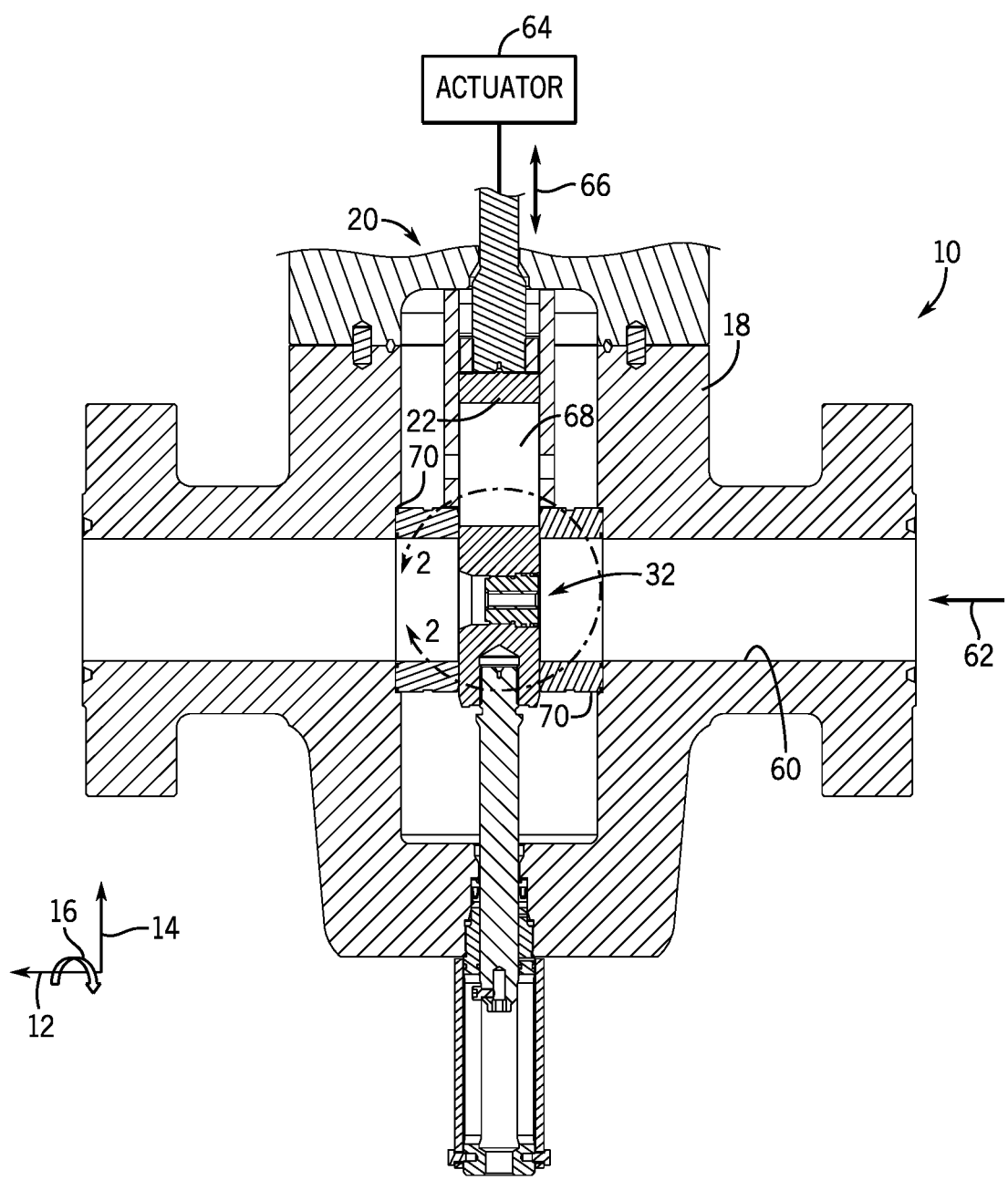
FIG. 1 is a side cross-sectional view of a choke gate valve, in accordance with an embodiment of the present disclosure.

One or more specific embodiments of the present disclosure will be described below. The particulars shown herein are by way of example, and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice.

Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure. Any examples of operating parameters and/or environmental conditions are not exclusive of other parameters/conditions of the disclosed embodiments.

When introducing elements of various embodiments of the present disclosure, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components. Certain terms are used throughout the description and claims to refer to particular features or components. As one skilled in the art will appreciate, different persons may refer to the same feature or component by different names. This document does not intend to distinguish between components or features that differ in name, but not function.

The present disclosure proposes to provide a valve with choke functionalities. In embodiments, it is proposed to provide a gate valve with choke functionalities, referred to herein as "a choke gate valve." In embodiments, the choke gate valve may be a FLS-R Gate Valve or a slab gate valve with a restricted bore for choking flow. This might be achieved by either machining a fixed opening or using a choke bean. The option of using the choke bean may allow multiple trims with various choke bean sizes to be used given the flow conditions and/or requirements (e.g., back pressure requirements), as well as allow replacement (e.g., exchange; removal and installation) on site. Further, the fixed opening or the choke bean provide a fixed and repeatable level of control of a flow of fluid through the choke gate valve (e.g., as opposed to a variable level of control and flow that occurs with typical choke valves). Advantageously, these features protect pumps against shock and wear, which improves longevity and reduces maintenance. In embodiments, the choke gate valve might allow two configuration options: fully open or restricted bore.

In embodiments, the choke gate valve may be used in tandem with an isolation skid valve (e.g., standard slab gate valve) in a fracturing system (e.g., a fracturing manifold). In such cases, the choke gate valve may provide a desired back pressure to keep pressure pumps running so operators can perform fracturing "on the fly," as described in more detail herein. This may save few hours of downtime each day, which would result in accumulative savings for any pad over a stimulation period. For example, once a fracturing operation is completed for a first well A, a restricted bore via the choke gate valve may enable a desired back pressure to keep a pump running while transition is made from the first well A to a second well B.

Figure 2:
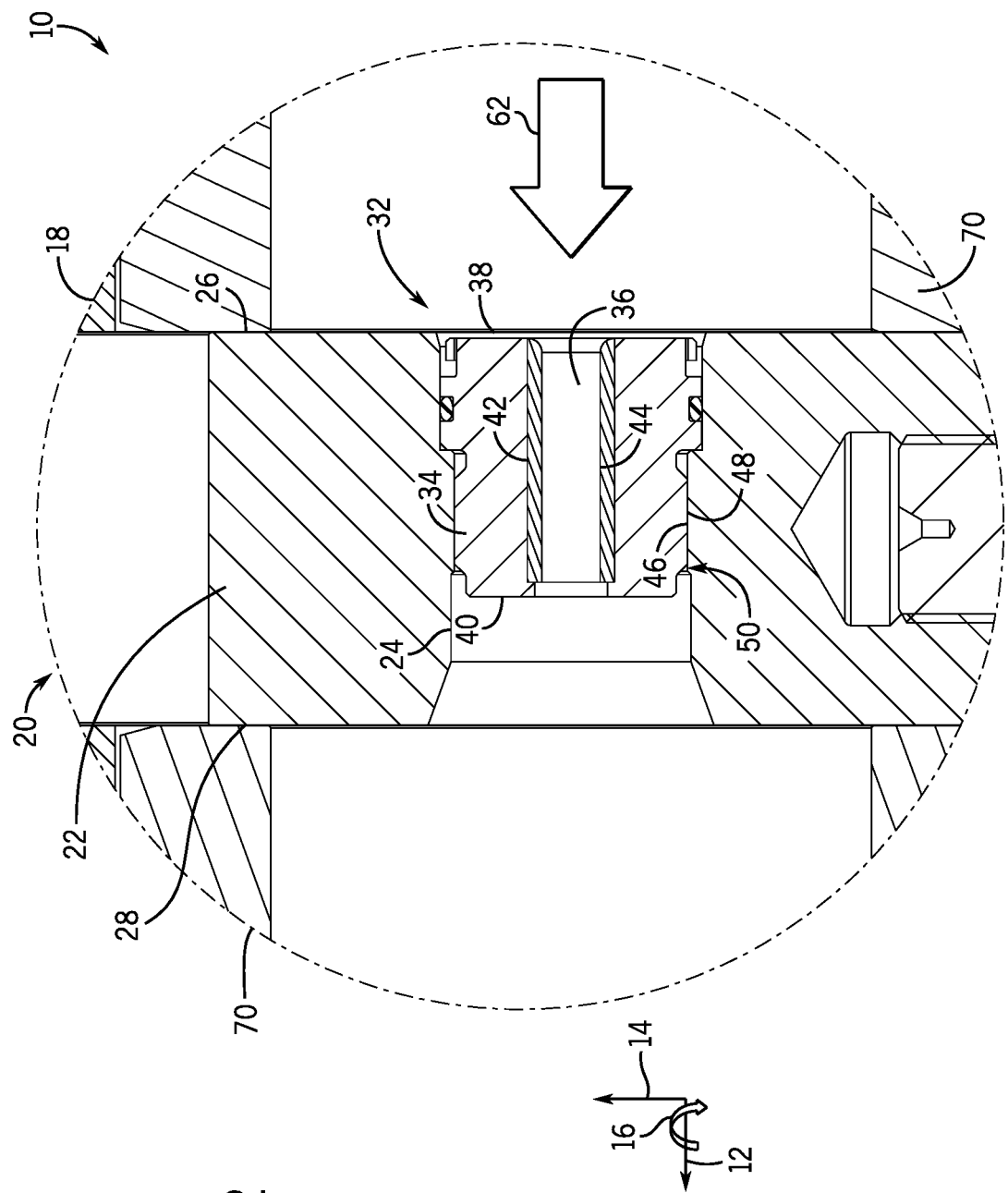
FIG. 2 is a side cross-sectional view of a portion of the choke gate valve of FIG. 1, in accordance with an embodiment of the present disclosure.

FIG. 1 is a side cross-sectional view of a choke gate valve 10, in accordance with an embodiment of the present disclosure. FIG. 2 is a side cross-sectional view of a portion of the choke gate valve 10, taken within line 2-2 of FIG. 1, in accordance with an embodiment of the present disclosure. To facilitate discussion, the choke gate valve 10 may be described with reference to an axial axis or direction 12, a radial axis or direction 14, and a circumferential axis or direction 16. As shown, the choke gate valve 10 includes a housing 18 and a gate 20 (e.g., gate assembly) positioned in the housing 18. The gate 20 includes a gate body 22 that defines an opening 24 (e.g., orifice). The opening 24 extends axially from a first face 26 (e.g., front face) to a second face 28 (e.g., rear face) of the gate body 22. As shown, the opening 24 may support an insert 32 (e.g., annular insert). The insert 32 may include an insert body 34 (e.g., annular insert body) that defines a choke bean 36 (e.g., orifice). The choke bean 36 extends axially from a first face 38 (e.g., front face) to a second face 40 (e.g., rear face) of the insert body 34. In some embodiments, an inner annular wall 42 of the insert body 34 may be lined with a liner 44 (e.g., tungsten carbide) to provide a wear-resistant surface along the choke bean 36.

The insert 32 may be coupled to the gate body 22 via any suitable interface (e.g., interference fit, mechanical fit, welding, fasteners, and/or threads). Further, the insert 32 may be coupled to the gate body 22 in a manner that enables efficient separation and/or installation. In some embodiments, an outer annular wall 46 of the insert body 34 may include a threaded surface and an inner annular wall 48 of the opening 24 of the gate body 22 may include a corresponding threaded surface, such that the insert 32 may be coupled to the gate body 22 via a threaded interface 50. The threaded interface 50 may enable an operator to efficiently separate the insert 32 from the gate body 22 by rotating the insert 32 in a first rotational direction relative to the gate body 22 until the threaded surfaces no longer contact one another. The threaded interface may also enable an operator to efficiently install the insert 32 on the gate body 22 by rotating the insert 32 in a second rotational direction relative to the gate body 22 until the threaded surfaces fully or substantially overlap (e.g., engage).

In operation, the choke gate valve 10 may essentially operate as a gate valve with choke functionality to throttle fluid flow. In particular, the housing 18 defines a fluid bore 60 that receives a fluid flow, as indicated by arrow 62. An actuator 64 is configured to drive the gate 20 to move within the housing 18, as indicated by arrow 66 (e.g., transverse to the fluid bore 60). The actuator 64 may be controlled hydraulically, pneumatically, or electrically, and thus, the choke gate valve 10 may be considered to be actuated via hydraulic, pneumatic, or electric control. Thus, the actuator 64 drives the gate 20 to move between a first position (e.g., throttle position or configuration) in which a throttling orifice (e.g., the opening 24 without the insert 32; the choke bean 36 of the insert 32) is aligned with the fluid bore 60 to throttle the fluid flow across the choke gate valve 10 and a second position (e.g., an open position or configuration) in which a full bore opening 68 is aligned with the fluid bore 60 to enable a full level of the fluid flow (e.g., a full or substantially full level of the fluid flow; the gate 20 does not restrict the fluid flow through the fluid bore 60) across the choke gate valve 10. In the illustrated embodiment, the choke gate valve 10 does not provide any closed position or configuration in which the gate 20 shuts off the fluid flow across the choke gate valve 10. For example, there is no portion of the gate 20 that is configured to seal against the housing 18 (e.g., against annular seats 70 of the housing 18) to shut off the fluid flow across the choke gate valve 10. Thus, in this case, the choke gate valve 10 has only two positions or configurations: the throttle position that provides throttled fluid flow and the open position that provides the full level of the fluid flow.

It should be appreciated that the opening 24 of the gate body 22 may be used as the throttling orifice (e.g., without the insert 32). The opening 24 may be machined into the gate body 22 and/or sized based on a variety of conditions (e.g., desired flow rate, fluid pressure, pump specifications). Further, it should be appreciated that multiple different inserts 32 that have multiple different size choke beans 36 (e.g., of different diameters) may be provided (e.g., as part of a kit of inserts 32). In this way, the operator may select an appropriate one of the multiple different inserts 32 based on the conditions. As noted herein, the insert 32 may also be efficiently separated from the gate body 22 and/or efficiently installed on the gate body 22 (e.g., via the threaded interface 50) so that the operator can swap one insert 32 for another insert 32 to change the size of the choke bean 36 in response to a change in the conditions.

Figure 3:
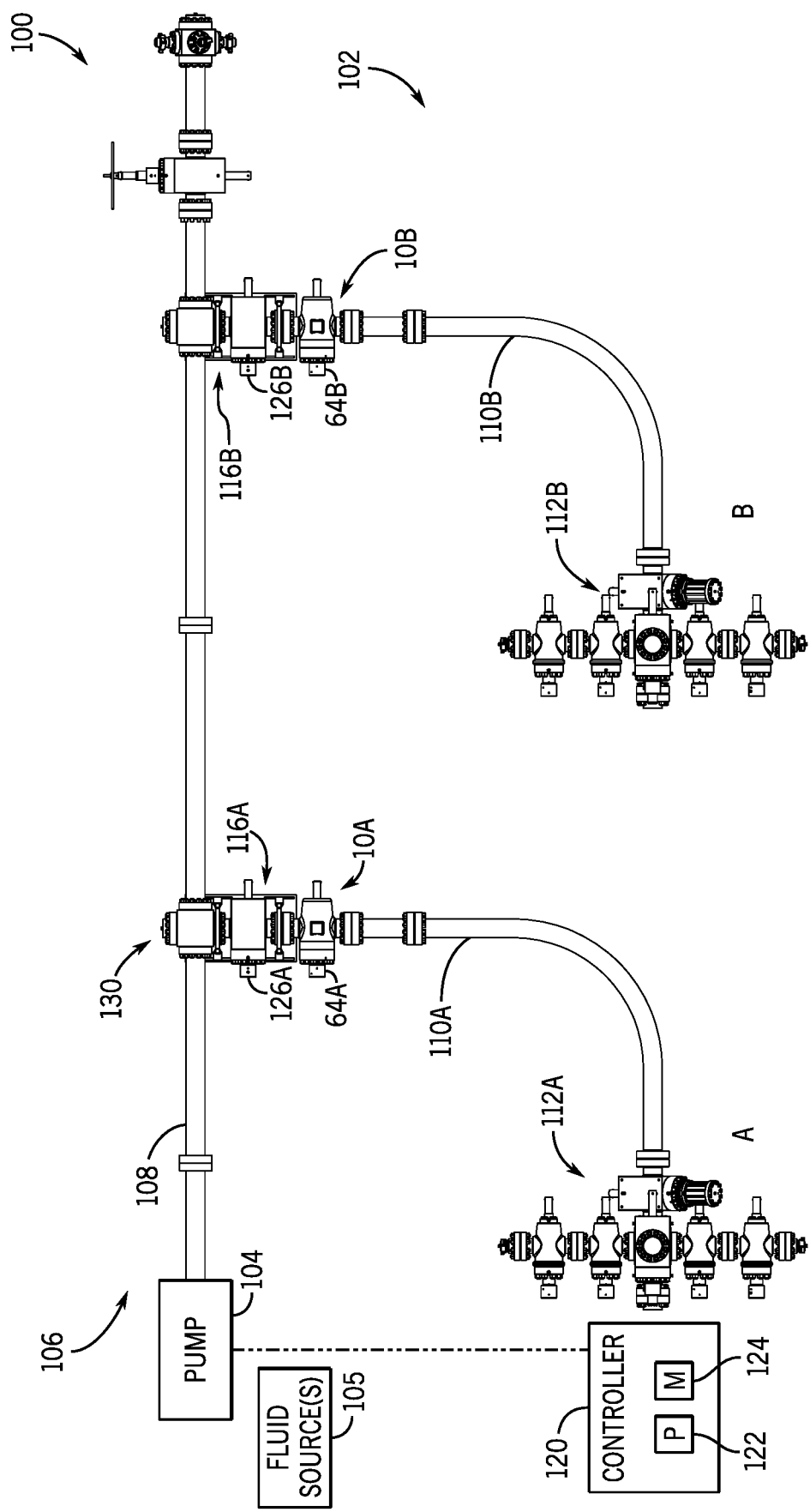
FIG. 3 is a front view of a choke gate valve system that includes the choke gate valve of FIG. 1 and is installed as part of a fracturing system, in accordance with an embodiment of the present disclosure.

FIG. 3 is a front view of a choke gate valve system 100 that includes the choke gate valve 10 and is installed as part of a fracturing system 102 (e.g., a fracturing manifold), in accordance with an embodiment of the present disclosure. In particular, the choke gate valve system 100 may include multiple choke gate valves 10, including a first choke gate valve 10A associated with a first well A and a second choke gate valve 10B associated with a second well B.

As shown, a pump 104 may pump fluid from one or more fluid sources 105 into a fluid line 106. The fluid line 106 may include a main line 108 (e.g., a trunk line) and multiple branches 110, such as a first branch 110A that extends between the main line 108 and a first tree 112A (e.g., fracturing tree) associated with the first well A and a second branch 110B that extends between the main line 108 and a second tree 112B (e.g., fracturing tree) associated with the second well B. The choke gate valve system 100 also includes multiple gate valves 116, such as a first gate valve 116A associated with the first well A and a second gate valve 116B associated with the second well B. Each gate valve 116 may be a slab gate valve with a respective housing and a respective gate that moves within the respective housing between a first position (e.g., a closed position or configuration) in which a solid portion of the respective gate is aligned with and seals across a respective fluid bore to shut off the fluid flow across the gate valve 116 and a second position (e.g., an open position or configuration) in which a respective full bore opening is aligned with the respective fluid bore to enable a full level of the fluid flow (e.g., a full or substantially full level of the fluid flow; the respective gate does not restrict the fluid flow through the respective fluid bore) across the gate valve 116.

As discussed in detail herein, the choke gate valve system 100 may facilitate efficient transition between first fracturing operations for the first well A and second fracturing operations for the second well B. Further, during the transition, the pump 104 may continue to run (e.g., continue to pump the fluid; at a lower rate compared to during the fracturing operations) and may not shut off. This may reduce downtime and improve efficiency, reduce wear on the pump 104 and other parts, reduce maintenance on the pump 104 and other parts, and so forth.

In particular, the first fracturing operations for the first well A may be carried out by pumping a proppant from the one or more fluid sources 105 into the fluid line 106 while the first choke gate valve 10A is in the open position to enable the full fluid flow across the first choke gate valve 10A, the first gate valve 116A is in the open position to enable the full fluid flow across the first gate valve 116A, and the second gate valve 116B is in the closed position to shut off the fluid flow across the second gate valve 116B. The second choke gate valve 10B may be in the throttle position or in the open position, as it is isolated from the fluid flow due to the second gate valve 116B being in the closed position. While the various valves are in these positions, the proppant may flow from the pump 104, through the main line 108, through the first gate valve 116A, through the first choke gate valve 10A, through the first branch 110A, and to the first tree 112A to fracture the first well A.

When the first fracturing operations for the first well A are complete, various steps may be carried out in a coordinated manner to transition from the first fracturing operations for the first well A to the second fracturing operations for the second well B. In some embodiments, to initiate the transition, the proppant may be shut off (e.g., a valve to the respective fluid source 105 may be closed) and the pump 104 may continue to pump a flushing fluid (e.g., water) to flush the fluid line 106 and/or the first tree 112A, for example. Then, a rate of the pump 104 may be reduced (e.g., during the first fracturing operations, the rate is a first, higher rate; during the transition, the rate is a second, lower rate). Generally at the same time (e.g., simultaneously or close in time, such as within seconds), the first choke gate valve 10A may be adjusted to the throttle position to throttle the fluid flow across the first choke gate valve 10A. This will maintain sufficient back pressure for operation of the pump 104, and thus, the pump 104 may continue to run without shutting off.

Then, the second choke gate valve 10B may be held at or adjusted to the throttle position to throttle the fluid flow or the open position to enable the full fluid flow across the second choke gate valve 10B. Further, the second gate valve 116B may be adjusted to the open position to enable the full fluid flow across the second gate valve 116B. Then, the first gate valve 116A may be adjusted to the throttle position to shut off the fluid flow across the first gate valve 116A. Then, the rate of the pump 104 may be increased (e.g., to return to the first, higher rate). Generally at the same time (e.g., simultaneously or close in time, such as within seconds), the second choke gate valve 10B may be adjusted to the open position to enable the full fluid flow across the second choke gate valve 10B (if the second choke gate valve 10B is not yet at the open position). Then, the proppant may be provided (e.g., the valve to the respective fluid source 105 may be opened) to carry out the second fracturing operations for the second well B.

As shown, each choke gate valve 10 may be positioned downstream of its paired gate valve 116, which may reduce wear on the choke gate valve 10 (e.g., as compared to each choke gate valve 10 being positioned upstream of its paired gate valve 116). For example, in FIG. 3, the first choke gate valve 10A is positioned downstream of the first gate valve 116A, and the second choke gate valve 10B is positioned downstream of the second gate valve 116B. Thus, each choke gate valve 10 is positioned between its paired gate valve 116 and its associated tree 112. Further, each gate valve 116 is positioned between the pump 104 and its paired choke gate valve 10. However, as noted, each choke gate valve 10 may be positioned upstream of its paired gate valve 116. In any case, each choke gate valve 10 is in line within its paired gate valve 116, such that the fluid flow travels from the pump 104, through both the gate valve 116 and through choke gate valve 10, and then to the associated tree 112.

It should be appreciated that the choke gate valve system 100 and the fracturing system 102 may include or be coupled to a controller 120 (e.g., electronic controller). The controller 120 may include a processor 122 and a memory device 124. The controller 120 may be communicatively coupled (e.g., via wired and/or wireless connections) to the pump 104, the first actuator 64A for the first choke gate valve 10A, the second actuator 64B for the second choke gate valve 10B, a first gate valve actuator 126A for the first gate valve 116A, a second gate valve actuator 126B for the second gate valve 116B, and/or various other actuators, devices, and so forth. For example, the controller 120 may be communicatively coupled to one or more actuators that adjust one or more valves that adjust respective flows of various fluids from the one or more fluid sources 105. The controller 120 may provide instructions (e.g., displayed instructions and/or control signals) for operations of the pump 104, the actuators 64A, 64B, 126A, 126B, and/or the various other actuators, devices, and so forth in a coordinated manner to carry out the disclosed techniques. For example, the instructions may include displayed instructions for the operator to manually operate a hydraulic power unit and/or other suitable component. Thus, the controller 120 may provide the instructions to carry out the first fracturing operations for the first well A, the second fracturing operations for the second well B, and a transition between the at least an end portion of the first fracturing operations for the first well A and at least a beginning of the second fracturing operations for the second well B without shutting off the pump 104.

The controller 120 may be a distributed controller including components located at a wellsite, a nearby control site, a remote site, or any combination thereof. The processor 122 may include one or more processors that are used to execute software, such as software for coordinating operation of the pump 104, the choke gate valves 10, the gate valve 116, and so forth. Moreover, the processor 122 may include one or more microprocessors, one or more "general-purpose" microprocessors, one or more special-purpose microprocessors, and/or one or more application specific integrated circuits (ASICs), or any combination thereof. For example, the processor 122 may include one or more reduced instruction set (RISC) processors. The memory device 124 include a volatile memory, such as random access memory (RAM), and/or a nonvolatile memory, such as read-only memory (ROM). The memory device 124 may store a variety of information and may be used for various purposes. For example, the memory device 124 may store processor-executable instructions (e.g., firmware or software) for the processor 122 to execute, such as instructions for coordinating operation of the pump 104, the choke gate valves 10, the gate valve 116, and so forth. The memory device 124 may include a storage device (e.g., nonvolatile storage), such as ROM, flash memory, a hard drive, or any other suitable optical, magnetic, or solid-state storage medium, or any combination thereof. The storage device may store data, such as control schedules, timing schedules, and/or look-up tables, for example.

It should be appreciated that the controller 120 may include any of a variety of additional components, such as a display screen, an input device (e.g., button, switch), a speaker, a light emitter, a communication device, or the like. The display screen may display information for visualization by the operator (e.g., a status of the choke gate valve system 100, such as respective positions of the choke gate valves 10 and/or the gate valves 116). The input device may enable the operator to provide inputs to the controller 120. It should be appreciated that the display screen may be a touchscreen display, and thus, the display screen may also operate as the input device. When present, the speaker may output audible alarms, the light emitter may output light indicators, and the communication device may communicate with other systems and/or devices.

As discussed in detail herein, the choke gate valve system 100 may facilitate efficient transition between the first fracturing operations for the first well A and the second fracturing operations for the second well B (e.g., the transition may take between about 30 to 90 seconds or 45 to 60 seconds). Further, it should be appreciated that choke gate valve system 100 may be configured to carry out multiple transitions between multiple fracturing operations for multiple wells. For example, when the second fracturing operations for the second well B are complete, the various steps may be carried out to transition from the second fracturing operations for the second well B to third fracturing operations for a third well, and so on.

It should be appreciated that variations in operational features are envisioned. Further, it should be appreciated that variations in structural features are envisioned. In some embodiments, instead of the choke gate valve 10, another type of throttling element (e.g., throttling assembly or system) may be positioned in line with the gate valve 116 to selectively throttle the fluid flow across the throttling element at various times during the transition from the first fracturing operations for the first well A to the second fracturing operations for the second well B. For example, at a location along the branch 110 between the gate valve 116 and the tree 112, one or more valves may be operated to selectively provide the fluid flow into a throttle line that has a plug (e.g., annular plug that defines a throttling orifice). Thus, during the transition from the first fracturing operations for the first well A to the second fracturing operations for the second well B, the one or more valves may be operated to enable the fluid flow to pass into the throttle line and through the plug to thereby throttle the fluid flow before returning the fluid flow back into the branch 110. In this way, the arrangement of the one or more valves, the throttle line, and the plug operate as a throttling element that adjusts from a first position (e.g., a throttle position or configuration) in which the throttling element throttles the fluid flow and a second position (e.g., an open position or configuration) in which the throttling element enables the full level of the fluid flow (e.g., by directing the fluid flow through the branch 110 without diversion to the throttle line and the plug). In any case, instead of a single gate valve (e.g., that only provides an open position and a closed position) or two identical gate valves (e.g., with one of the gate valves being provided for use as a backup valve; that each only provide an open position and a closed position) in line with one another to control the fluid flow from the pump 104 to the tree 112, the choke gate valve system 100 and/or the fracturing system 102 disclosed herein provide two different valves or assemblies (e.g., one that only provides an open position and a closed position, and one that only provides or at least only effectively provides an open position and a throttle position) in line with one another to control the fluid flow from the pump 104 to the tree 112.

Figure 4:
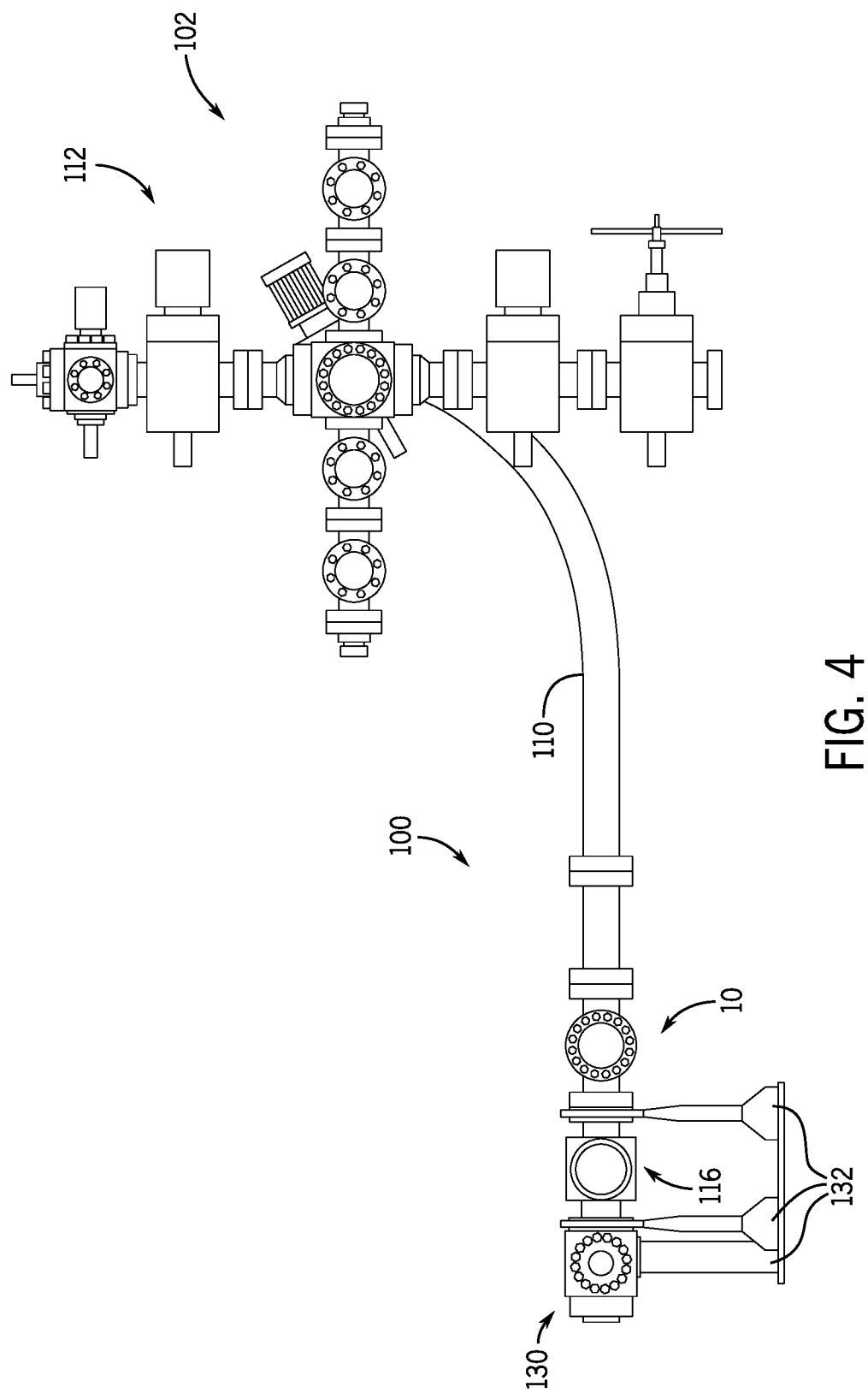
FIG. 4 is a side view of the choke gate valve system of FIG. 3, in accordance with an embodiment of the present disclosure.

FIG. 4 is a side view of the choke gate valve system 100 that includes the choke gate valve 10 and is installed as part of the fracturing system 102, in accordance with an embodiment of the present disclosure. As shown, the choke valve 10 and the gate valve 116 are in line with one another and are positioned between a connector 130 (shown in both FIGS. 3 and 4 for clarity) that couples to the main line 108 of FIG. 3 and the branch 110. In particular, the choke valve 10 is coupled to the gate valve 116 via one or more respective fasteners at a respective flange connection, and the gate valve 116 is coupled to the connector 130 via one or more respective fasteners at a respective flange connection. However, as noted herein, the gate valve 116 may be downstream of the choke gate valve 10, and thus, the connections may have any suitable order or arrangement. In some embodiments, the choke gate valve 10, the gate valve 116, and/or the connector 130 may be supported via one or more brackets 132 and/or other support structures to provide efficient assembly and/or stability for the choke gate valve system 100.

Figure 5:
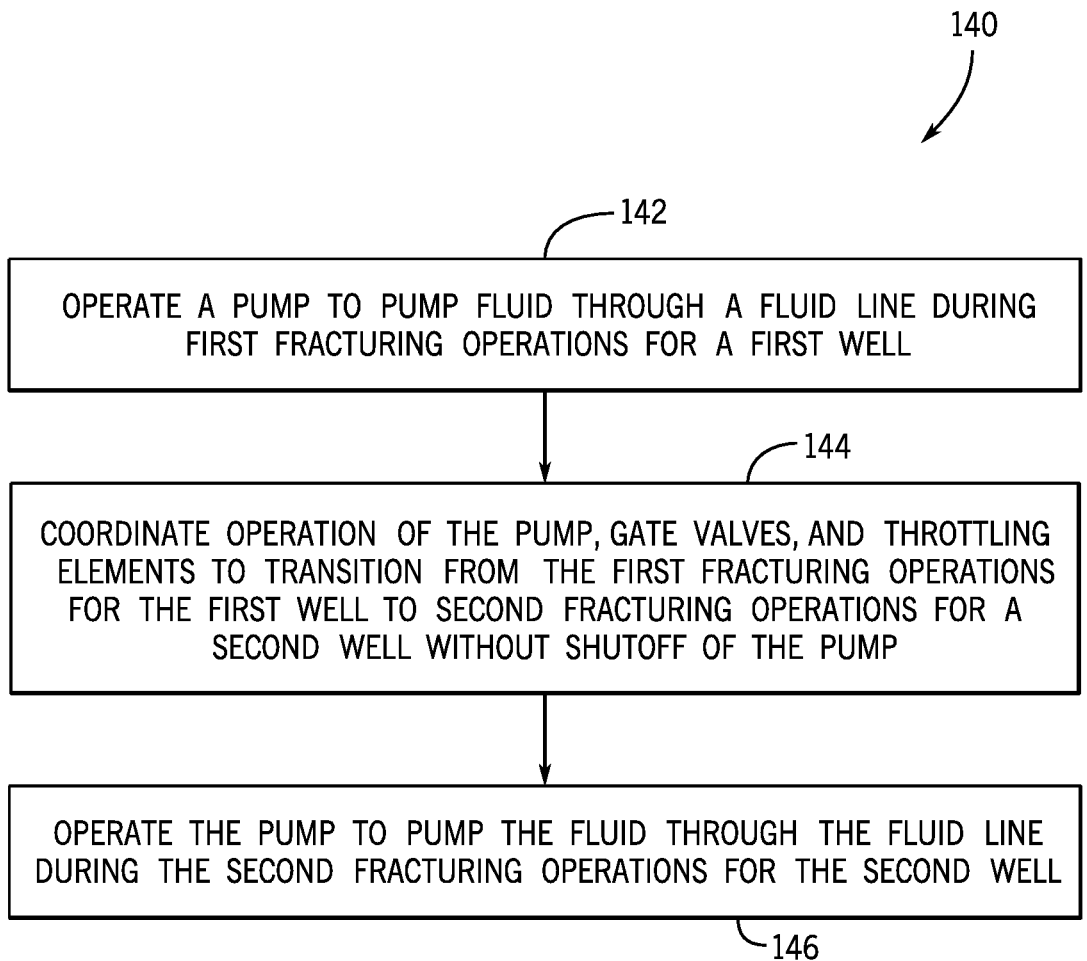
FIG. 5 is a flow diagram of a method of operating a choke gate valve system as part of a fracturing system, in accordance with an embodiment of the present disclosure.

FIG. 5 is a flow diagram of a method 140 of operating a choke gate valve system as part of a fracturing system, in accordance with an embodiment of the present disclosure. For example, the method 140 may be utilized to operate the choke gate valve system 100 of FIGS. 3 and 4 as part of the fracturing system 102 of FIGS. 3 and 4. The following description of the method 140 is described as being performed by a controller, but it should be noted that any suitable processor-based device or system may be specially programmed to perform any of the methods described herein. Moreover, although the following description of the method 140 is described as including certain steps performed in a particular order, it should be understood that the steps of the method 140 may be performed in any suitable order, that certain steps may be omitted, and/or that certain steps may be added.

In block 142, the method 140 may begin with operating a pump to pump a fluid through a fluid line during first fracturing operations for a first well. For example, a controller may provide instructions to operate the pump to pump the fluid, such as a proppant, through the fluid line, through a first gate valve that is in an open position, and through a first throttling element that is in an open position to provide the fluid to a first tree for the first well. The first throttling element may include a first choke gate valve.

In block 144, the method 140 may include coordinating operation of the pump, multiple gate valves, and multiple throttling elements to transition from the first fracturing operations for the first well to second fracturing operations for a second well without shut off of the pump. For example, the controller may provide instructions to temporarily reduce a rate of the pump, and also to temporarily throttle the fluid flow through the first throttling element that is in a throttle position to throttle the fluid to provide sufficient back pressure for the pump. Then, the controller may provide instructions to adjust one or more valves (e.g., a second gate valve and/or a second throttling element) associated with the second well to enable full fluid flow to a second tree for the second well. Then, the controller may provide instructions to adjust the first gate valve to a closed position to shut off the fluid flow to the first tree for the first well. The second throttling element may include a second choke gate valve. Importantly, the method 140 may carry out the transition without shut off of the pump, thereby reducing downtime, maintenance, and so forth.

In block 146, the method 140 may include operating the pump to pump the fluid through the fluid line during the second fracturing operations for the second well. For example, the controller may provide instructions to operate the pump to pump the fluid, such as the proppant, through the fluid line, through the second gate valve that is in an open position, and through the second throttling element that is in an open position to provide the fluid to the second tree for the second well. The second throttling element may include a second choke gate valve. It should be appreciated that during the block 142, the second tree for the second well is isolated from the pump via the second gate valve associated with the second well. Further, it should be appreciated that during the block 146, the first tree for the first well is isolated from the pump via the first gate valve associated with the first well.

Figure 6:
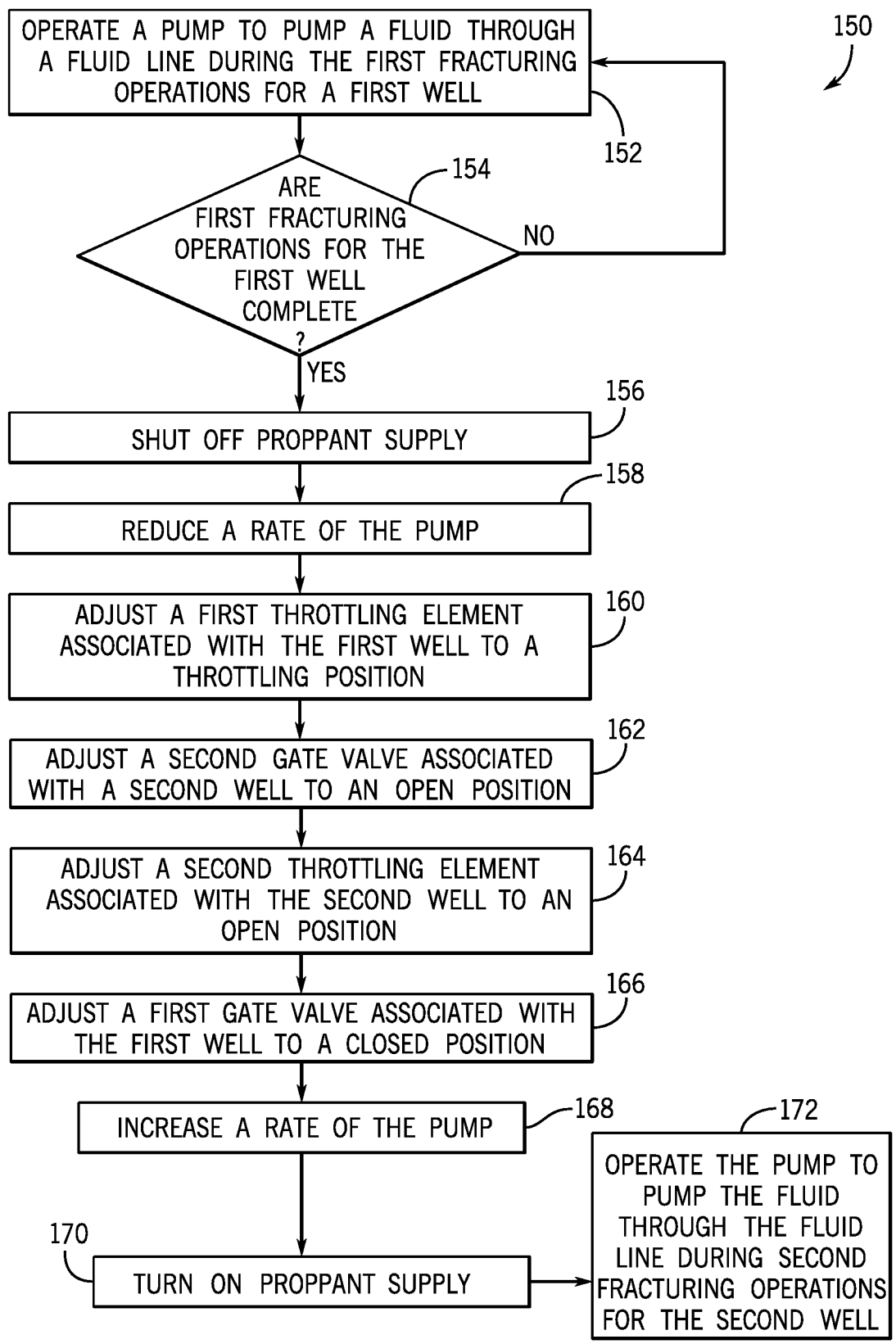
FIG. 6 is a flow diagram of a method of operating a choke gate valve system as part of a fracturing system, including multiple blocks that specify adjustment of elements of the choke gate valve system, in accordance with an embodiment of the present disclosure.

FIG. 6 is a flow diagram of a method 150 of operating a choke gate valve system as part of a fracturing system, in accordance with an embodiment of the present disclosure. For example, the method 150 may be utilized to operate the choke gate valve system 100 of FIGS. 3 and 4 as part of the fracturing system 102 of FIGS. 3 and 4. The following description of the method 150 is described as being performed by a controller, but it should be noted that any suitable processor-based device or system may be specially programmed to perform any of the methods described herein. Further, certain blocks of the method 150 may be carried out by an operator (e.g., a human operator; via manual operation of a hydraulic power unit and/or other suitable component; in some cases, the operator may be considered to be the controller). Moreover, although the following description of the method 150 is described as including certain steps performed in a particular order, it should be understood that the steps of the method 150 may be performed in any suitable order, that certain steps may be omitted, and/or that certain steps may be added.

In block 152, the method 150 may begin with operating a pump to pump a fluid through a fluid line during first fracturing operations for a first well. For example, a controller may provide instructions to operate the pump to pump the fluid, such as a proppant, through the fluid line, through a first gate valve that is in an open position, and through a first throttling element that is in an open position to provide the fluid to a first tree for the first well. The first throttling element may include a first choke gate valve.

In block 154, the method 150 may include determining whether the first fracturing operations for the first well are complete. For example, the controller may receive an input from the operator and/or data from one or more sensors that indicate that the first fracturing operations for the first well are complete. If the first fracturing operations for the first well are not complete, the method 150 may continue to operate the pump to pump the fluid through the fluid line during the first fracturing operations for the first well. However, if the first fracturing operations for the first well are complete, the method 150 may continue to block 156.

In block 156, the method 150 may include shutting off a proppant supply. For example, the controller may provide instructions to one or more valves to block the proppant from flowing from the proppant supply to the pump, while a flushing fluid (e.g., water) continues to flow from its respective supply to the pump.

In block 158, the method 150 may include reducing a rate of the pump (e.g., the pump may operate at a first, higher rate in block 152 and at a second, lower rate in block 154; reduce to a lower, non-zero rate without shut off of the pump). In block 160, the method 150 may include adjusting a first throttling element associated with the first well to a throttle position, which may provide sufficient back pressure for the pump to continue its operation (e.g., without shut off of the pump). Blocks 158 and 160 may be carried out at essentially the same time (e.g., simultaneously or close in time, such as within seconds).

The method 150 may continue to adjust one or more valves to eventually provide a full fluid flow to a second tree associated with a second well. For example, in block 162, the method 150 may include adjusting a second gate valve associated with a second well to an open position. At this time, a second throttling element may be in a throttle position or in an open position. However, in block 164, the method 150 eventually includes adjusting the second throttling element associated with the second well to the open position (e.g., at least prior to the fracturing operations for the second well, such as prior to block 168 or at the same time as block 168).

In block 166, the method 150 may include adjusting a first gate valve associated with the first well to a closed position. The first gate valve may be moved to the closed position only after the second gate valve is in the open position (with the second throttling element in the throttle position or the open position) so that the fluid flow may travel toward the second well. Then, in block 168, the method 150 may include increasing the rate of the pump (e.g., the pump may operate at the second, lower rate in block 154 and at the first, higher rate in block 168). In block 170, the method 150 may include turning on the proppant supply. For example, the controller may provide instructions to one or more valves to enable the proppant from flowing from the proppant supply to the pump.

In block 172, the method 150 may include operating the pump to pump the fluid through the fluid line during the second fracturing operations for the second well. For example, the controller may provide instructions to operate the pump to pump the fluid, such as the proppant, through the fluid line, through the second gate valve that is in an open position, and through the second throttling element that is in an open position to provide the fluid to the second tree for the second well. The second throttling element may include a second choke gate valve. It should be appreciated that during the block 152, the second tree for the second well is isolated from the pump via the second gate valve associated with the second well. Further, it should be appreciated that during the block 172, the first tree for the first well is isolated from the pump via the first gate valve associated with the first well.

While the subject disclosure is described through various embodiments, it will be understood by those of ordinary skill in the art that modification to and variation of the described and illustrated embodiments may be made without departing from the inventive concepts herein disclosed. Moreover, while some embodiments are described in connection with various illustrative structures, one skilled in the art will recognize that the system may be embodied using a variety of specific structures.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A choke gate valve system comprising:
a fluid line fluidly coupling a pump to a first tree and a second tree, wherein the first tree is coupled to a first well of a fracturing system and the second tree is coupled to a second well of the fracturing system, and wherein the pump is configured to deliver a fluid flow from a fluid source to the first well via the first tree and from the fluid source to the second well via the second tree;
a first gate valve positioned along the fluid line between the pump and the first tree;
a first choke gate valve positioned along the fluid line between the pump and the first tree, and in line with the first gate valve;
a second gate valve positioned along the fluid line between the pump and the second tree; and
a second choke gate valve positioned along the fluid line and the second tree and in line with the second gate valve.

2. The choke gate valve system of claim 1, wherein the first gate valve is configured to adjust between a respective closed position to shut off the fluid flow across the first gate valve and a respective open position to enable the fluid flow across the first gate valve, and the first choke gate valve is configured to adjust between a respective throttle position to throttle the fluid flow across the first choke gate valve and a respective open position to enable a respective full level of the fluid flow across the first choke gate valve.

3. The choke gate valve system of claim 1, wherein the first choke gate valve is downstream of the first gate valve, such that the first choke gate valve is configured to be positioned between the first gate valve and the first tree.

4. The choke gate valve system of claim 1, wherein the second gate valve is configured to adjust between a respective closed position to shut off the fluid flow across the second gate valve and a respective open position to enable the fluid flow across the second gate valve, and the second choke gate valve is configured to adjust between a respective throttle position to throttle the fluid flow across the second choke gate valve and a respective open position to enable a respective full level of the fluid flow across the second choke gate valve.

5. The choke gate valve system of claim 1, comprising a controller configured to control the pump, the first gate valve, the first choke gate valve, the second gate valve, and the second choke gate valve in a coordinated manner to transition from a first fracturing operation through the first tree and a second fracturing operation through the second tree without shut off of the pump.

6. The choke gate valve system of claim 5, wherein the controller is configured to:

provide respective instructions to reduce a pump rate of the pump and provide respective instructions to move the first choke gate valve to a respective throttle position to throttle the fluid flow across the first choke gate valve;

subsequently provide respective instructions to move the second gate valve to a respective open position to enable the fluid flow across the second gate valve; and subsequently provide respective instructions to increase the pump rate of the pump and provide respective instructions to move the first gate valve to a respective closed position to shut off the fluid flow across the first gate valve.

7. The choke gate valve system of claim 1, the first choke gate valve comprising:
   a housing that defines a fluid bore, wherein the fluid flow flows through the fluid bore; and
   a gate comprising:
      a gate body comprising a first opening and a second opening;
      an insert disposed in the first opening, the insert defining a choke bean that extends from a first side of the insert to a second side of the insert; and
      a liner disposed in the choke bean,
      wherein the gate is configured to move within the housing between a throttle position in which the gate extends across the fluid bore to position the choke bean in the fluid bore to throttle the fluid flow through the fluid bore and an open position in which the second opening is positioned in the fluid bore to allow a full level of the fluid flow through the fluid bore.

8. A method of operating a choke gate valve system, the method comprising:
   pumping a fluid flow from a fluid source through a fluid line and through a first gate valve in an open position to a first well during a first fracturing operation;
   pumping the fluid flow from the fluid source through the fluid line and through a throttling element during a transition from the first fracturing operation for the first well to a second fracturing operation for a second well; and
   pumping the fluid flow from the fluid source through the fluid line and through a second gate valve in an open position to the second well during the second fracturing operation.

9. The method of claim 8, comprising pumping the fluid flow at a first flow rate during the first fracturing operation for the first well, and pumping the fluid flow at a second flow rate that is less than the first flow rate during the transition from the first fracturing operation for the first well to the second fracturing operation for the second well.

10. The method of claim 8, comprising continuously pumping the fluid flow to carry out at least an end portion of the first fracturing operation for the first well, the transition from the first fracturing operation for the first well to the second fracturing operation for the second well, and at least a beginning portion of the second fracturing operation for the second well.

11. The method of claim 8, wherein the throttling element comprises a choke gate valve.

12. The method of claim 11, comprising controlling the choke gate valve to move from the open configuration to a throttle configuration to throttle the fluid flow across the choke gate valve during the transition.

13. The method of claim 11, wherein the choke gate valve comprises:
   a housing that defines a fluid bore, wherein the fluid flow flows through the fluid bore; and
   a gate comprising:
      a gate body comprising a first opening and a second opening;
      an insert disposed in the first opening, the insert defining a choke bean that extends from a first side of the insert to a second side of the insert; and
      a liner disposed in the choke bean,
      wherein the gate is configured to move within the housing between a throttle position in which the gate extends across the fluid bore to position the choke bean in the fluid bore to throttle the fluid flow through the fluid bore and an open position in which the second opening is positioned in the fluid bore to allow a full level of the fluid flow through the fluid bore.

14. The choke gate valve system of claim 7, wherein the liner is a tungsten carbide liner.

* * * * *